(12) United States Patent
Novikov et al.

(10) Patent No.: US 10,156,064 B1
(45) Date of Patent: Dec. 18, 2018

(54) MODULAR CONSTRUCTION SYSTEM AND METHOD

(71) Applicants: Petr Novikov, San Francisco, CA (US); Fedor Novikov, San Francisco, CA (US)

(72) Inventors: Petr Novikov, San Francisco, CA (US); Fedor Novikov, San Francisco, CA (US)

( * ) Notice: Subject to any disclaimer, the term of this patent is extended or adjusted under 35 U.S.C. 154(b) by 0 days.

(21) Appl. No.: 15/625,038

(22) Filed: Jun. 16, 2017

(51) Int. Cl.
*E04B 1/19* (2006.01)
*E04B 1/41* (2006.01)
*E04B 1/32* (2006.01)
*E04B 1/00* (2006.01)
*E04B 1/38* (2006.01)

(52) U.S. Cl.
CPC .......... *E04B 1/1903* (2013.01); *E04B 1/3211* (2013.01); *E04B 1/40* (2013.01); *E04B 2001/0061* (2013.01); *E04B 2001/1963* (2013.01); *E04B 2001/3247* (2013.01); *E04B 2001/405* (2013.01)

(58) Field of Classification Search
CPC ........ E04B 1/1903; E04B 1/40; E04B 1/3211; E04B 2001/405; E04B 2001/0061; E04B 2001/3247; E04B 2001/1963
See application file for complete search history.

(56) References Cited

U.S. PATENT DOCUMENTS

| | | | | |
|---|---|---|---|---|
| 4,012,872 A | * | 3/1977 | Stolpin | E04B 1/3211 52/127.1 |
| 4,509,879 A | * | 4/1985 | Pearce | E04B 1/1903 403/172 |
| 4,941,767 A | * | 7/1990 | Kidd | E04B 1/1903 403/171 |
| 7,546,845 B2 | * | 6/2009 | Prusmack | E04H 1/1272 135/120.3 |
| 7,766,796 B2 | * | 8/2010 | Pizmony | A63B 9/00 482/35 |
| 9,816,263 B2 | * | 11/2017 | Lee | E04B 1/3211 |
| 2007/0056618 A1 | * | 3/2007 | Prusmack | E04H 1/1272 135/120.3 |
| 2009/0176622 A1 | * | 7/2009 | Pizmony | A63B 9/00 482/35 |
| 2014/0284832 A1 | * | 9/2014 | Novikov | B29C 67/0088 264/40.1 |
| 2014/0348572 A1 | * | 11/2014 | Matsuzawa | E04B 1/19 403/57 |
| 2015/0059263 A1 | * | 3/2015 | Pacaci | E04B 1/24 52/143 |

(Continued)

*Primary Examiner* — Rodney Mintz
(74) *Attorney, Agent, or Firm* — Matthew M. Googe; Robinson IP Law, PLLC

(57) ABSTRACT

A modular unit for forming a multiple member joint includes: an elongate body; a bracket attached adjacent an end of the elongate body, the bracket located around a longitudinal axis of the modular unit; a plurality of connectors associated with the bracket with a position retention mechanism, the plurality of connectors extending from the end of the elongate body parallel to a longitudinal axis of the modular unit; and one or more connector joints attached at a distal end of the plurality of connectors, wherein the one or more connector joints are adapted to join with one or more connector joints of connectors extending from connectors of an adjoining modular unit.

16 Claims, 14 Drawing Sheets

(56) References Cited

U.S. PATENT DOCUMENTS

| | | | |
|---|---|---|---|
| 2015/0167288 A1* | 6/2015 | Harkin | E01D 6/00 403/107 |
| 2017/0241127 A1* | 8/2017 | Ross | E04B 1/26 |
| 2017/0298613 A1* | 10/2017 | Lee | E04B 1/3211 |
| 2018/0094424 A1* | 4/2018 | Gutierrez | E04B 1/1903 |

* cited by examiner

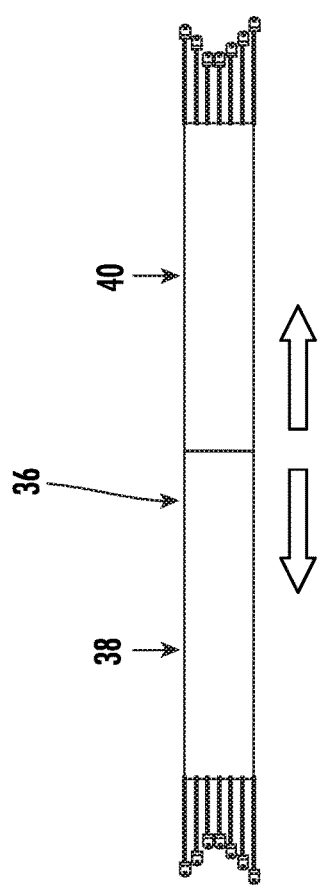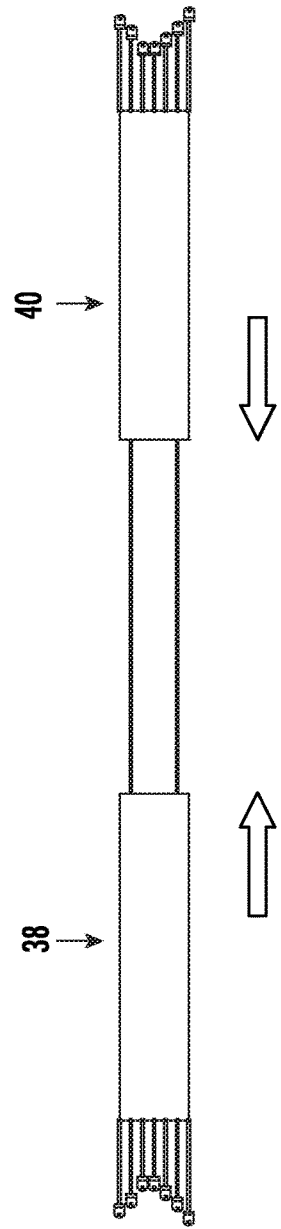

MODULAR CONSTRUCTION SYSTEM AND METHOD

FIELD

This invention relates generally to the construction field, and more specifically to a new and useful modular construction system and method in the construction field.

BACKGROUND

Conventionally, forming customized, complex lattice structures is extremely costly due to the high variability in the joints and chord lengths that are required. The high variability in the joints can be conventionally accommodated by using joints with multiple connection points, which not only leads to wasted material but also limits the available joint angles that can be achieved to those formed between the connection points, or by using custom-fabricated joints, which can be extremely costly. Furthermore, because these joints and chords are custom-made, the majority of these building materials cannot be reused.

Thus, there is a need in the construction field to create a new and useful system and method for complex lattice structure construction. This invention provides such new and useful system and method.

SUMMARY

The above and other needs are met by a system and method for complex lattice structure construction. In a first aspect, a modular unit for forming a multiple member joint includes: an elongate body; a bracket attached adjacent an end of the elongate body, the bracket located around a longitudinal axis of the modular unit; a plurality of connectors associated with the bracket with a position retention mechanism, the plurality of connectors extending from the end of the elongate body parallel to a longitudinal axis of the modular unit; and one or more connector joints attached at a distal end of the plurality of connectors. The one or more connector joints are adapted to join with one or more connector joints of connectors extending from connectors of an adjoining modular unit.

In one embodiment, the bracket further includes a first coupling rail and a second coupling rail defining a coupling groove formed around the longitudinal axis of the modular unit, the coupling groove sized to receive a portion of each of the plurality of connectors therethrough.

In another embodiment, the plurality of connectors further include a threaded portion formed along a length of the plurality of connectors and at least one nut threadably engaged with the threaded portion of the connectors, wherein the position retention mechanism comprises the threaded portion of the connectors secured through the coupling groove of the bracket with the at least one nut.

In yet another embodiment, the elongate body includes a shell that is attached to the bracket around an outer diameter of the bracket.

In one embodiment, the bracket further includes a plurality of clamps having opposing members and a fastener for securing the opposing members of the clamps to the modular unit, wherein each of the clamps secures an end of the connectors to the modular unit.

In another embodiment, the modular unit further includes at least one slot formed around a perimeter of the modular unit adjacent the end of the modular unit, wherein the fastener extends through the opposing members and the slot to adjustably secure the connectors to the modular unit.

In another embodiment, the bracket further includes a clamp formed around the end of the modular unit, wherein positions of the connectors are retained between the clamp and the modular unit when the clamp is substantially tightened.

In yet another embodiment, a second modular unit is formed according to the modular unit described above, the second modular unit joined with the modular unit described above at the one or more connector joints attached at the distal ends of the plurality of connectors.

In one embodiment, connectors of the modular unit are joined with connectors of the second modular unit such that the longitudinal axis of the modular unit is angled relative to a longitudinal axis of the second modular unit. In another embodiment, the bracket and plurality of connectors are attached at both a first end and a second end of the elongate body.

In yet another embodiment, a working length of the plurality of connectors between joint ends of the connectors is adjustable.

In a second aspect, a multiple member joint is provided having: first and second modular units, each of the first and second modular units including an elongate body, a bracket attached adjacent an end of the elongate body, the bracket located around a longitudinal axis of the modular unit, a plurality of connectors associated with the bracket with a position retention mechanism, the plurality of connectors extending from the end of the elongate body parallel to a longitudinal axis of the modular unit, and one or more connector joints attached at a distal end of the plurality of connectors, wherein the one or more connector joints are adapted to join with one or more connector joints of connectors extending from connectors of an adjoining modular unit. The connector joints of the first modular unit are joined with the connector joints of the second modular unit to join the first modular unit and the second modular unit at a joint.

In one embodiment, the multiple member joint further includes: a third modular unit having an elongate body, a bracket attached adjacent an end of the elongate body, the bracket located around a longitudinal axis of the modular unit, a plurality of connectors associated with the bracket with a position retention mechanism, the plurality of connectors extending from the end of the elongate body parallel to a longitudinal axis of the modular unit, and one or more connector joints attached at a distal end of the plurality of connectors, wherein the one or more connector joints are adapted to join with one or more connector joints of connectors extending from connectors of an adjoining modular unit. Connector joints of the first modular unit are joined with connector joints of both the second modular unit and the third modular unit to join the first modular unit with the second modular unit and the third modular unit.

In one embodiment, the multiple member joint further includes: a fourth modular unit having an elongate body, a bracket attached adjacent an end of the elongate body, the bracket located around a longitudinal axis of the modular unit, a plurality of connectors associated with the bracket with a position retention mechanism, the plurality of connectors extending from the end of the elongate body parallel to a longitudinal axis of the modular unit, and one or more connector joints attached at a distal end of the plurality of connectors, wherein the one or more connector joints are adapted to join with one or more connector joints of connectors extending from connectors of an adjoining modular unit. Connector joints of the first modular unit are joined with connector joints of each of the second modular unit, the third modular unit, and the fourth modular unit to join the first modular unit with the second modular unit, the third modular unit, and the fourth modular unit.

In a third aspect, a lattice structure includes a plurality of interconnected cords, each of the interconnected cords including an elongate body, a bracket attached adjacent an end of the elongate body, the bracket located around a longitudinal axis of the modular unit, a plurality of connectors associated with the bracket with a position retention mechanism, the plurality of connectors extending from the end of the elongate body parallel to a longitudinal axis of the modular unit, and one or more connector joints attached at a distal end of the plurality of connectors, wherein the one or more connector joints are adapted to join with one or more connector joints of connectors extending from connectors of an adjoining modular unit. Connector joints of the chords are joined with connector joints of adjacent chords to join the chords at a plurality of joints of the lattice structure.

In one embodiment, the lattice structure further includes a cover attached to the lattice structure over the plurality of chords.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

FIGS. 12A and 12B are schematic representations of a variation of a chord having adjustable length in a first and second configuration, respectively, according to one embodiment of the present disclosure;

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

Figure 1:
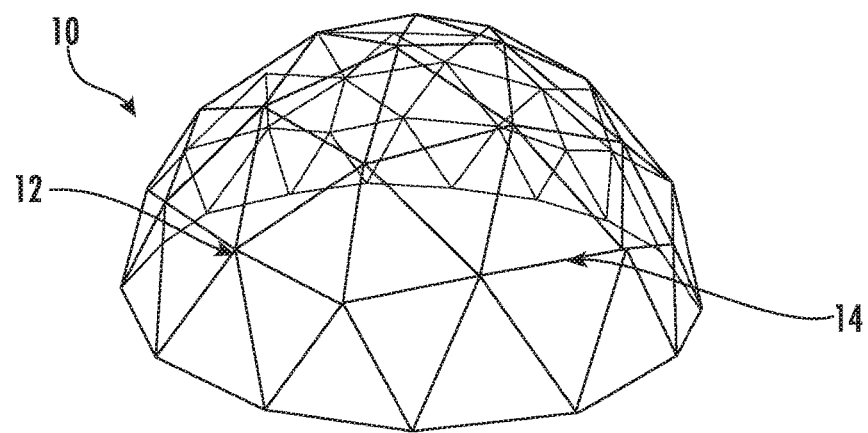
FIG. 1 is a schematic representation of a lattice structure built according to one embodiment of the present disclosure.
Figure 2:
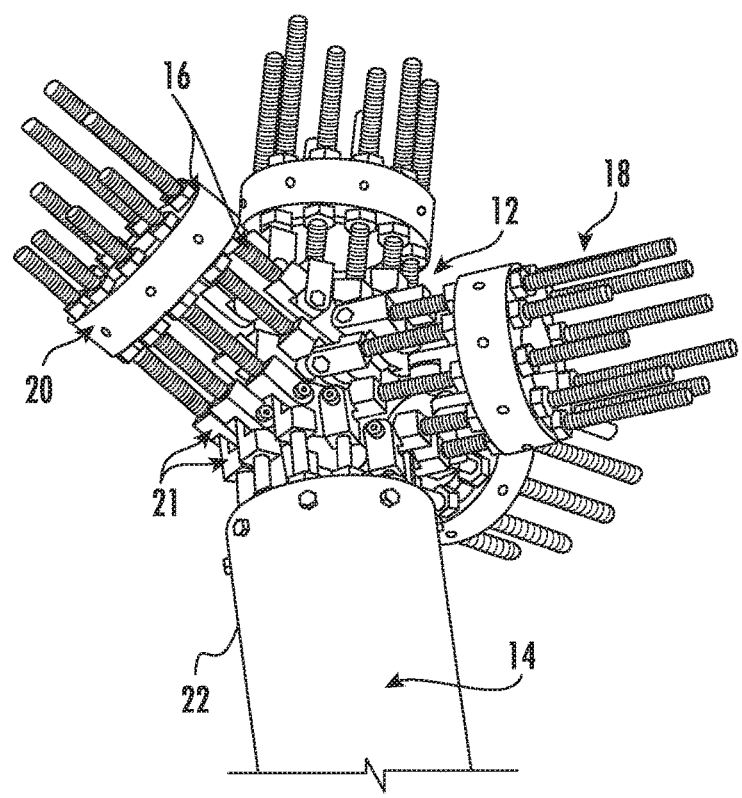
FIG. 2 is a schematic representation of a sample joint formed by multiple modular units according to one embodiment of the present disclosure.

A modular construction system of the present disclosure enables the construction of structures having a variety of shapes that can be formed from a lattice, such as a structure 10 shown in FIG. 1. As shown in FIG. 2, a joint 12 of the modular construction system includes a plurality of modular units 14 joined by one or more coupling mechanisms 16, wherein each modular unit 14 includes a plurality of connectors 18 radially arranged about a longitudinal axis of the modular unit 14 and a bracket 20. The connectors 18 include a plurality of joint ends 21 allowing an angle of attached connectors 18 to be adjusted in relation to each other. Each of the plurality of modular units 14 may further include a shell body 22 connected to the bracket 20 and disposed along a length of the modular units 14. The modular units 14 of the construction system of the present disclosure may be assembled, adjusted, fixed, and joined by an automatic assembly system, but can alternatively be manually assembled, adjusted, fixed, and/or joined, or utilized in any other suitable manner.

By utilizing a plurality of connectors 18 that have adjustable angular positions about a longitudinal axis of a modular unit 14, adjustable rotational positions, and adjustable joint angles with at least one connector 18 of an additional modular unit 14, the modular construction system enables the modular units 14 to be joined together in a plurality of different angles and orientations. Furthermore, because the plurality of connectors 18 may have adjustable lengths and adjustable linear positions relative to a lateral axis of a modular unit 14, the modular construction system of the present disclosure enables each modular unit 14 to obtain at least one of a plurality of different lengths, thereby enabling construction of structures with a plurality of different chord lengths. Moreover, if removable coupling mechanisms are used to transiently retain an angular and/or linear position of the connector 18 relative to an axis of a modular unit 14, a structure formed by the modular construction system can be dynamically adjusted after construction (e.g., after multiple module units have been joined together).

Referring again to FIG. 1, the structure 10 formed by the modular construction system is preferably a lattice, but can alternatively be any other suitable structure. The lattice is preferably formed from a set of polygons (e.g., triangles), wherein each side of a polygon is preferably formed by one or more modular units 14, but can alternatively be constructed in any other suitable manner. The resultant structure can be transient or permanent. The structure can be dynamically adjustable or substantially static.

The structure 10 may be formed by an automated construction system, but can alternatively be formed manually or formed in any other suitable manner. The automated construction system can adjust lengths of the modular units 14, angles of a joint of the connectors 18, the angles of a joint of the modular units 14, or any other suitable parameter of the modular unit 14. The automated construction system can additionally or alternatively function to form each modular unit 14 from component connectors 18, brackets 20, and shells, adjust the connector working lengths, adjust each connector positioning relative to the bracket (e.g., angular position, linear position, rotational position, etc.), or adjust any other suitable modular unit parameter. The automated construction system can perform any suitable portion of the method disclosed below, wherein the remaining portions can be performed manually or performed in any other suitable manner. The automated construction system is preferably a robotic rig, but can alternatively be a mobile robot capable of climbing the built structure, or be any other suitable automated system.

Figure 3:
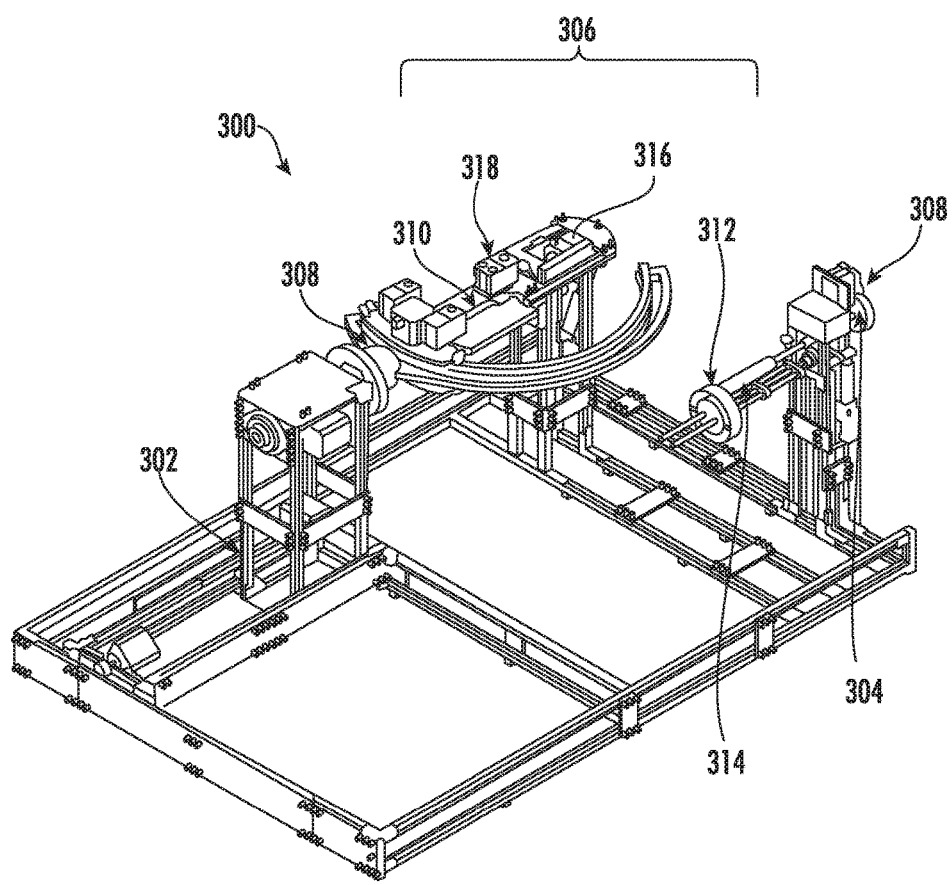
FIG. 3 is a schematic representation of an automated construction system of modular units according to one embodiment of the present disclosure.

In one variation, as shown in FIG. 3, the automated construction mechanism 300 includes a rig that supports a connector positioning mechanism 302, a bracket positioning mechanism 304, and a joining mechanism 306. The connector and bracket positioning mechanisms 302 and 304 respectively can each include a positioning arm 308 configured to support a connector 310 and bracket 312 of the modular unit, respectively. The positioning mechanisms are preferably capable of rotating the connector and/or bracket about a lateral axis, but can alternatively translate the connector and/or bracket along a line, rotate the connector and/or bracket about a longitudinal axis, or retain the connector and/or bracket in any other suitable position. In one variation, the positioning mechanisms include a 2-axis CNC positioning device.

The connector and/or bracket positioning mechanism can additionally or alternatively include a position retention device 314 that functions to retain the connector position relative to the bracket using a position retention mechanism. In one variation, the connector positioning mechanism can include a first set of position retention devices (e.g., to adjust a first nut to the predetermined position along a connector length) and the bracket positioning mechanism can include a second set of position retention devices (e.g., to adjust a second nut to the opposing predetermined position along the connector length). However, the automated construction mechanism can include any other suitable position retention device distributed in any other suitable manner.

The joining mechanism can include a joint positioning mechanism 316 and a joining force application mechanism 318. In one variation, the joint positioning mechanism 316 can include a 2-axis CNC positioning device, and the joining force application mechanism 318 can include a motor configured to apply a screw force to a joining component, such as a screw.

The connectors 18 of each of the modular units 14 functions to connect to corresponding connectors of another of the modular units 14. Each modular unit 14 preferably includes a plurality of connectors 18. Each of the plurality of connectors 18 is preferably substantially identical, but can alternatively be different, with different lengths, widths and ends, or vary in any other suitable manner. Each of the plurality of connectors 18 are preferably arranged in the same direction relative to the longitudinal axis of the modular unit 14, with all first ends of the connectors 18 arranged along a first end of the modular unit 14, but can alternatively be arranged in any other suitable manner.

Figure 4:
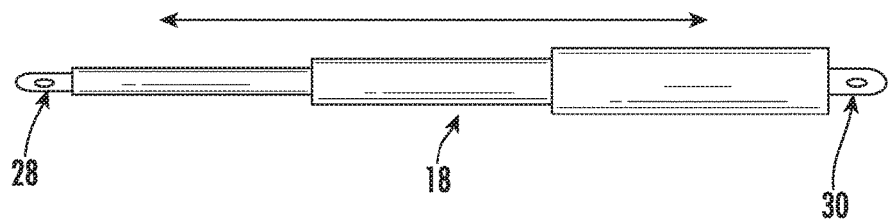
FIGS. 4 and 5 are schematic representations of a first and second variation of the connector, respectively, according to embodiments of the present disclosure.
Figure 5:
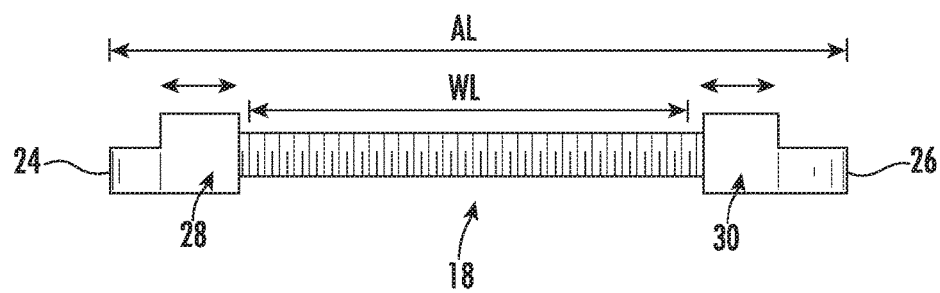

Referring to FIGS. 4 and 5, each of the plurality of connectors 18 preferably includes a first connector end 24 and a second connector end 26, with an absolute length AL of the connectors 18 extending therebetween. The connectors 18 can additionally or alternatively include a first joint end 28 and a second joint end 30, with a working length WL defined therebetween. The first joint end 28 and second joint end 30 are preferably the first and second connector ends, 24 and 26 respectively, wherein a length of the connector 18 is adjustable. However, the first and second joint ends 28 and 30 can alternatively be secondary pieces that translate along a length of the connector 18 and/or about a longitudinal axis of the connector 18, such that the first and second joint ends 28 and 30 are arranged proximal the first and second connector ends 24 and 26, respectively, or arranged in any other suitable location along the absolute length AL of the connector 18. The first and second joint ends 28 and 30 function to form a joint with first and second joint ends 28 and 30 of a connector 18 of a second modular unit 14. The first and second joint ends 28 and 30 are preferably complimentary parts of a joint 32 (FIG. 6), but can alternatively be the same part of a joint. The joint 32 formed by connection of joint ends 21 of connectors 18 can be entirely formed from joint ends 21, or can be formed using a joining mechanism 34, such as a pin, screw, weld, or other joining mechanism. The joint 32 formed between the connectors 18 of first and second modular units 14 is preferably angularly adjustable, but can alternatively be substantially static. The resulting joint 32 is preferably a rotary joint, but can alternatively be a universal joint, knuckle joint, turnbuckle, pin joint, cotter joint, bolted joint, screw joint, welded joint, or any other suitable joint.

The working length WL of the connector 18 defines a length of a lattice chord, but can alternatively or additionally function to define the resultant joint angle between two modular units 14. The working length WL is preferably adjustable, but can alternatively be substantially static. In one variation, as shown in FIG. 4, the connector 18 telescopes along a longitudinal axis of the connector 18, wherein locking mechanism(s) transiently or statically retain a desired length of the connector 18. The locking mechanism can be a ball spring, triangular spring, or any other suitable locking mechanism. In a second variation, as shown in FIG. 5, the connector 18 can have a static absolute length, wherein the positions of the first and/or second joint ends 28 and 30 along a length of the connector 18 are adjusted to obtain the desired length.

In an example of the second variation described above, the connector 18 includes a linear screw portion formed along at least a partial length of the connector and at least one of the first and second joint ends 28 and 30 includes a nut, wherein rotation of the nut along the longitudinal axis of the linear screw moves one of the first and second joint ends 28 and 30 along the length of the linear screw portion. The linear screw portion can additionally include stops along a length of the linear screw portion that prevent translation of one of the first and second joint ends 28 and 30 along the linear screw portion beyond the stop.

In a third variation as shown in FIGS. 12A and 12B, a length of a chord 36 can be adjusted by adjusting a relative position of supports retaining the connector 18. In one example, each chord 36 includes a first support 38 and second support 40 arranged coaxially, wherein each support retains a set of connectors 18. A relative position of the first support 38 is preferably adjustable relative to a position of the second support 40 (e.g., using a telescoping mechanism, rail mechanism, or any other suitable mechanism), but can alternatively be substantially statically retained.

Referring again to FIG. 6, the bracket 20 of the modular unit 14 retains a position of a first connector 41 relative to a second connector 42. The bracket 20 preferably retains the relative position of adjacent connectors 18, but can additionally and alternatively retain an angular position of a longitudinal axis of the first connector 41 relative to a central axis of the bracket 20, retain a linear position of the bracket along a length of the first connector 41, retain an angular position of the first connector 41 relative to the second connector 42, retain a rotational (e.g., angular) position of a longitudinal axis of the first connector 41 relative to the bracket 20, or retain any other suitable position of the first connector 41 relative to a reference point on the bracket 20 or secondary connector. The bracket 20 preferably has a profile substantially similar to a cross section of the modular unit 14, but can alternatively have any other suitable profile. The bracket 20 preferably includes a central axis, but can alternatively include any other suitable reference axis. Each modular unit 14 preferably includes at least one bracket 20.

Figure 6:
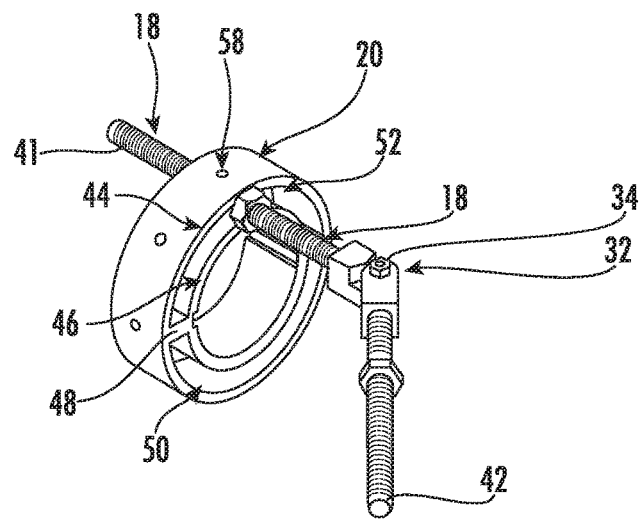
FIG. 6 is a schematic representation of a connector connected to a second connector at a joint end and a bracket along a portion of the connector length according to one embodiment of the present disclosure.

In a first variation, as shown in FIG. 6, the bracket 20 preferably includes a first coupling rail 44 and a second coupling rail 46, wherein the first and second coupling rails 44 and 46 respectively are arranged concentrically about a central axis of the bracket 20. However, the bracket 20 can alternatively have any other suitable configuration. The first and second coupling rails 44 and 46 are preferably connected by a first and second opposing intermediate rail 48 extending radially from the first rail 44 to the second rail 46 to connect the first rail 44 to the second rail 46. Each of the first coupling rail 44 and second coupling rail 46 can include an inner and outer arcuate surface and first and second opposing planar surfaces. The first and second rails preferably cooperatively define one or more coupling grooves 50 extending along an arcuate portion of the bracket 20. The coupling groove 50 is preferably substantially smooth, but can alternatively include a plurality of divots that retain an arcuate position of connectors 18 along the coupling groove 50. In a second variation, the bracket 20 can be cooperatively formed from a set of sub-brackets, wherein each sub-bracket couples a first and second connector together. In a third variation, the bracket 20 is a curable material, such as a thermoset or epoxy, wherein the curable material retains the relative positions of adjacent connectors. However, the bracket 20 can be any other suitable mechanism for retaining positions of attached connectors 18.

The module unit can additionally include a position retention mechanism 52 that functions to transiently or permanently retain a position of the connector 18 relative to the bracket 20. The position retention mechanism 52 can be part of the connector 18, part of the bracket 20, or may be a separate component from the bracket 20 or connector 18. The position retention mechanism can be a clip, protrusion, groove, magnetic element, adhesive, bounding element (e.g., a pair of nuts tightened to either side of the bracket), or any other suitable mechanism.

Figures 10A, 10B:
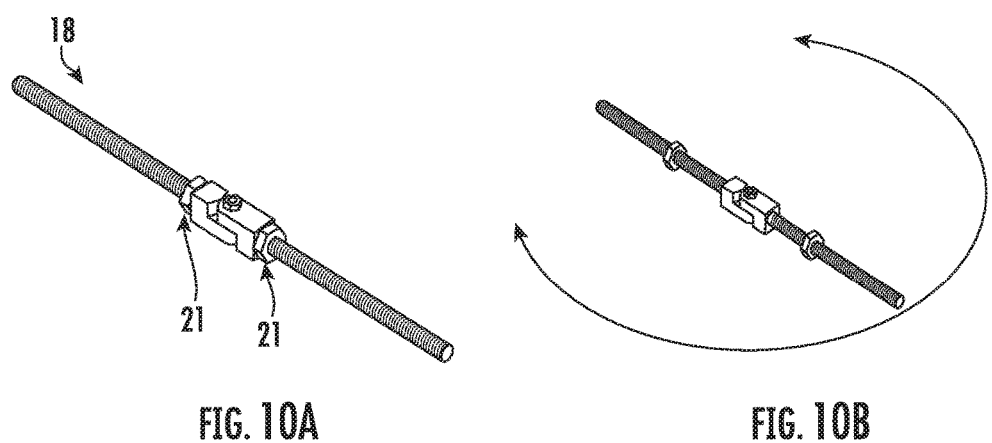
FIGS. 10A, 10B, 10C, 10D, 10E, 10F, 10G, and 10H are schematic representations of the sub-processes of a first example method of constructing a structure using the modular units according to embodiments of the present disclosure.
Figure 10C:
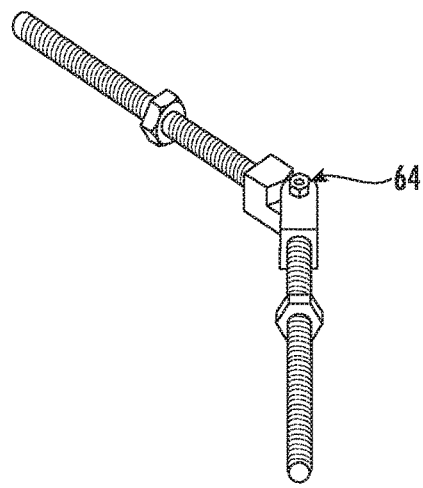
Figure 10D:
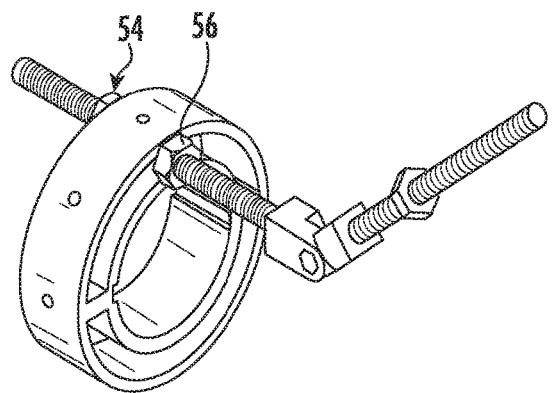

In a first variation, as shown in FIG. 10D, the position retention mechanism can include a first nut 54 and a second nut 56 that translate along a length of the connector 18 and abuts first and second planar surface of the first coupling rail 44 and second coupling rail 46, respectively. In a second variation, the position retention mechanism 52 includes threading along the inner arcuate surface of the outer coupling rail and/or the outer arcuate surface of the inner coupling rail. The threading is preferably complimentary to the threading along the outer arcuate surface of the connector, but can alternatively be any other suitable threading. In a third variation, the position retention mechanism 52 is included on the connector, wherein the connector includes a retention mechanism (e.g., a clip, screw, etc.) that couples to a retention groove extending along a surface of the coupling groove 50. In a fourth variation, the position retention mechanism 52 can be a pair of magnetic elements that generates an attractive force between the connector and bracket. However, the position retention mechanism 52 can include any other suitable retention mechanism.

As shown in FIG. 2, the modular unit 14 can additionally include the shell 22 that functions to mechanically protect the set of connectors 18 coupled to the bracket 20. The modular unit 14 can encapsulate the set of connectors 18 coupled to the bracket 20, and can additionally or alternatively encapsulate the bracket 20, position retention mechanisms 52, or any other suitable modular unit 14 component as well. The shell 22 is preferably a singular piece, but can alternatively be composed from multiple segments. In one example, the shell 22 can be formed from multiple segments connected along a longitudinal axis (e.g., from multiple cylinders aligned along the respective central axes), wherein each segment can include a unit length or have variable lengths. In a second example, the shell 22 can be formed from multiple segments connected about a longitudinal axis (e.g., from multiple arcuate segments connected along an edge parallel to the longitudinal axis), wherein each segment can include a unit arc length or have variable arc lengths. The shell 22 can be substantially rigid, or can be deformable. Ends of the shell 22 may be formed to substantially match a profile of the joint 12 (e.g., within a threshold range of error) between respective modular units 14, but can alternatively have a predetermined profile. The shell 22 may be attached to the bracket 20 with a fastener inserted into the shell and into a bore 58 of the bracket.

The modular construction system can additionally include a cover 60 (FIG. 7) that stretches between modular units. The cover 60 is preferably flexible, but can alternatively be substantially rigid. The cover 60 can be cloth, rubber, metal, glass, a sprayed-on material, or be any other suitable material. The cover 60 preferably mounts to a portion of the modular units 14 of the structure 10, but can alternatively be supported by the modular unit 14 or be otherwise retained by the modular units 14. The covering 60 can mount to one or more modular units 14 (e.g., be hooked to the joint, shell, or connector of a modular unit, etc.), include an adhesive surface proximal the modular units 14 that adheres to the modular unit 14, or include any other suitable coupling mechanism. The covering 60 is preferably applied to the structure after construction, but can alternatively be applied as the modular units are joined and/or formed.

A method of constructing the structure 10 includes constructing a lattice model 62 for the structure, identifying variables for each modular unit based on the lattice model, orienting each modular unit based on the variables, and coupling the set of modular units together based on the lattice model.

Figure 7:
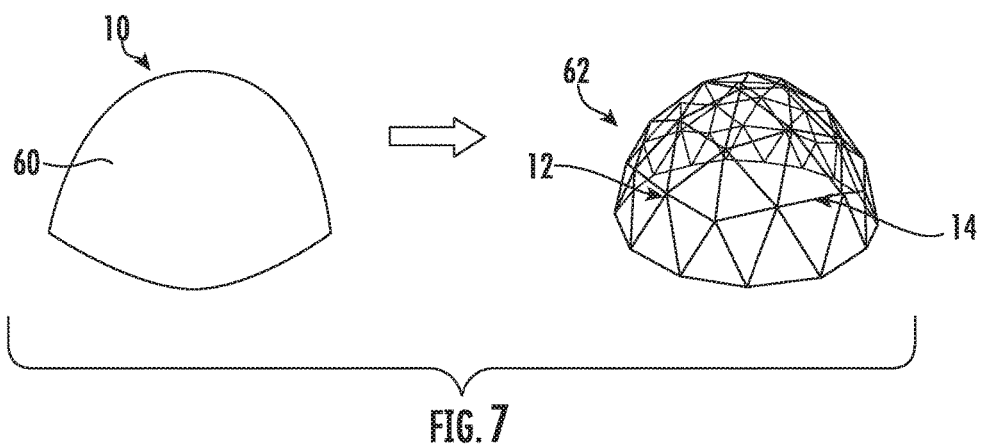
FIG. 7 is an example of generating a lattice model for a structure according to one embodiment of the present disclosure.
Figure 8A:
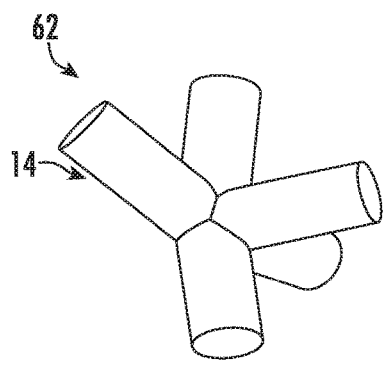
FIGS. 8A and 8B are examples of modeling the lattice structure using representations of modular units and modeling the lattice structure using representations of modular units, each modular unit including a set of connectors coupled by brackets, respectively, according to one embodiment of the present disclosure.
Figure 8B:
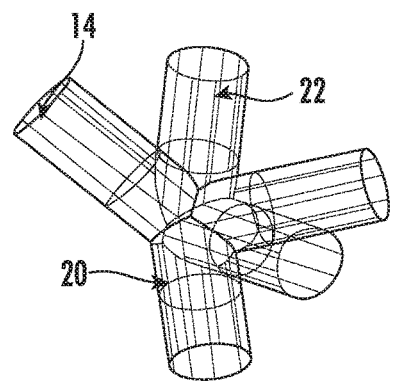

Constructing the lattice model 62 for the structure preferably includes digitally deconstructing a structure into sub-components, an example of which is shown in FIGS. 7, 8A, and 8B, wherein each sub-component is preferably a specified polygon but can alternatively be any other suitable shape. Digitally deconstructing the structure 10 can include using finite element methods (e.g., based on force distribution) or any other suitable method. Constructing the lattice model for the structure preferably includes determining the length of each chord of each sub-component and determining the joint angle between each chord. Constructing the lattice model for the structure can additionally or alternatively include determining an amount of force each chord or joint will bear, which can be used to select a number of composite connectors for each modular unit forming the chord and/or selecting the type of joint (e.g., joint end) that will be used to form the respective joint.

Identifying the variables for each modular unit based on the lattice model preferably includes identifying the variables for modular unit assembly, an example of which is shown in FIGS. 8A and 8B. Identifying the variables can include identifying a length of each modular unit (e.g., based on the chord length), a number of modular units that will be used (e.g., based on the chord lengths, the number of chords, etc.), a joint profile or structure (e.g., based on the angle between the chords), or identifying any other suitable variable value. Identifying the variables can additionally include determining a number of connectors per modular unit (e.g., based on the load the respective modular unit is expected to bear), or identifying any other suitable variable.

Identifying variables for each modular unit can additionally include identifying variables for each connector of each modular unit. Variables for each connector include working length of the connector, location of the joint ends along a length of the connector, the angle formed by a connector end (e.g., joint end) with a connector end (e.g., joint end) of a second connector of a second modular unit, the number of connectors included in each modular unit, the arcuate distance between adjacent connectors in the modular unit, the working length of the connector beyond a bracket (e.g., linear position of a first connector relative to a second connector of the same modular unit), the angular position of the connector, or any other suitable variable. The variables for each connector are preferably determined based on the lattice model, but can alternatively be determined in any other suitable manner.

Identifying the variables for each modular unit can additionally include forming modular units having predetermined end profiles defined by the lattice model. In a first variation, forming modular units having the predetermined end profiles includes constructing modular units, then adjusting the connectors or joint ends to meet the predetermined end profile. In a second variation, forming modular units having the predetermined end profiles includes adjusting the connectors or joint ends to meet the predetermined end profile, then constructing the modular units from a plurality of pre-adjusted or positioned connectors. In the second variation, the connectors of a first modular unit can be connected to the connectors of a second modular unit prior to assembly with other connectors of the first modular unit. However, the modular units having the predetermined end profiles can be otherwise formed.

Figure 9:
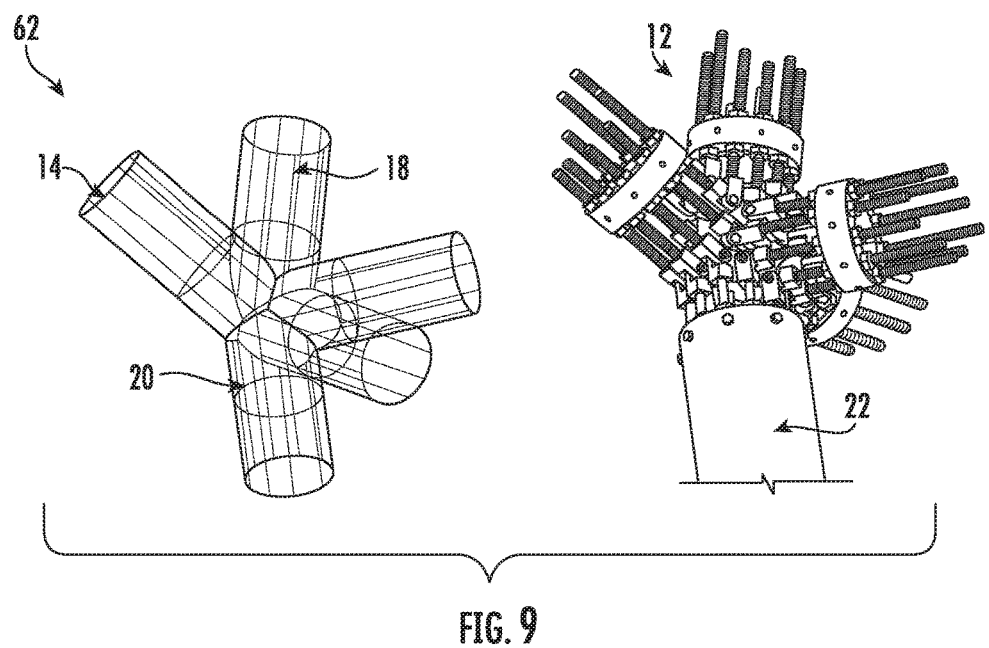
FIG. 9 is a schematic representation of a lattice model and the corresponding structure formed by modular units according to one embodiment of the present disclosure.

Constructing the modular unit 14 functions to couple the constituent components of the modular unit 14 together, as shown in FIG. 9. Constructing the modular unit 14 can additionally function to form a modular unit 14 having connectors 18 oriented at the proper relative positions to cooperatively form the joint profile defined by the lattice model 62. Constructing the modular unit 14 preferably includes positioning the connector 18 within the bracket 20 relative to a reference point, coupling the connector 18 to the bracket 20, and arranging the shell 22 over the connector 18, but can additionally or alternatively include any other suitable process. Positioning the connector 18 within the bracket 20 relative to a reference point preferably includes positioning the connector 18 in a predetermined arcuate position along the bracket 20 based on the model, but can alternatively or additionally include positioning the connector 18 in a predetermined linear position relative to the bracket 20 or include positioning the connector in any other suitable manner. One example of positioning the connector 18 in a predetermined linear position relative to the bracket 20 includes positioning the connector 18 such that a midpoint of the connector 18 working length WL or other portion of the connector 18 is a predetermined distance away from the bracket 20, wherein the predetermined distance is determined based on a lattice model, as described in greater detail below. The reference point used for connector positioning is preferably a second connector connected to the same bracket 20, but can alternatively be a bracket feature (e.g., a bracket groove end, a notch on the bracket, an arbitrarily selected point on the bracket, etc.) or be any other suitable feature.

Coupling the connector 18 to the bracket 20 preferably includes coupling the position retention mechanism 52 to the connector 18, but can alternatively or additionally include coupling the position retention mechanism 52 to the bracket 20. In a first variation, coupling the connector 18 to the bracket 20 includes coupling a first position retention mechanism to the connector 18, positioning the first position retention device at a predetermined position along a length of the connector 18, coupling the connector 18 to the bracket 20, coupling a second position retention mechanism to the connector 18, and positioning the second position retention mechanism at a second predetermined position along a length of the connector 18, wherein the first and second predetermined positions are determined based on a lattice model, the linear position of the connector 18 relative to the bracket 20, dimensions of the bracket 20 (e.g., the bracket thickness), and/or any other suitable parameter. In a second variation, coupling the connector 18 to the bracket 20 includes translating the connector 18 relative to the bracket 20 until the predetermined connector linear position is achieved, then coupling the connector 18 to the bracket 20. In a specific example, the connector 18 is pushed through a groove of the bracket 18 until the predetermined connector linear position is achieved, and a screw is inserted through an aperture extending radially through the bracket to retain the connector linear position. However, the connector 18 can be otherwise coupled to the bracket 20.

Constructing the modular unit 14 can additionally include constructing the connector 18, which can include coupling a joint end 21 to the connector 18 and positioning the joint end 21 on the connector 18. Coupling the joint end 21 to the connector 18 can include coupling the joint end 21 to an end of the connector 18, wherein positioning the joint end 21 includes translating (e.g., sliding, screwing, etc.) the joint end 21 to a predetermined position based on a lattice model. Alternatively, constructing the connector 18 can include arranging the joint end 21 at the predetermined position, then coupling the joint end 21 to the predetermined position along a length of the connector 18 (e.g., clamping the joint end at the predetermined position). Constructing the connector 18 can additionally include angling the joint end 21 relative to a longitudinal axis of the connector 18, either before or after the joint end 21 has been coupled to the connector 18. Constructing the connector 18 can additionally or alternatively include assembling the constituent pieces of the connector 18 (e.g., assembling the telescoping pieces of the connector together) or include any other suitable process. However, the connectors 18 can be otherwise constructed.

Orienting each modular unit 14 based on the determined variables functions to arrange and transiently retain the modular unit 14 in a three-dimensional space, based on a respective chord in the lattice model. The modular unit 14 is preferably oriented relative to a reference point, but can be otherwise oriented. The reference point is preferably a secondary modular unit, but can alternatively be a geographic location, a gravity vector, a mounting point (e.g., of a mounting structure), or any other suitable reference point. The modular unit 14 is preferably arranged by an automated construction system, but can alternatively be arranged manually or otherwise manipulated. Orienting the modular unit 14 preferably includes orienting a longitudinal axis of the modular unit at a predetermined angular position relative to the reference point, but can alternatively or additionally include orienting a n end of the modular unit 14 (e.g., joint end 21) predetermined distance away from the reference point, rotating the modular unit 14 about the longitudinal axis such that the connectors 18 of the first modular unit match with respective connectors 18 of a second modular unit based on a lattice model, or include orienting any other suitable portion of the modular unit 14 relative to the reference point.

Coupling the set of modular units 14 together based on the lattice model 62 functions to create the structure defined by the lattice model 62. Coupling the set of modular units 14 preferably includes joining a first modular unit to a second modular unit, but can alternatively include any other suitable process. Joining a first modular unit to a second modular unit functions to join chords of the lattice together. Joining a first modular unit to a second modular unit preferably includes joining the joint ends 21 of adjacent connector ends of the first and second modular units together, but can alternatively include joining the joint end 21 of the first modular unit to the second modular unit or include joining the first and second modular units together in any other suitable manner. Joining the first and second modular units can include welding, clipping, pinning, or otherwise joining adjacent ends of a first and second modular unit. The ends can be joined before, during, or after the modular units are oriented.

Figure 10E:
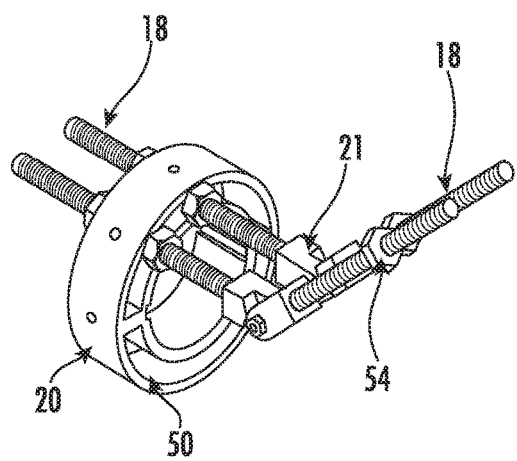
Figure 10F:
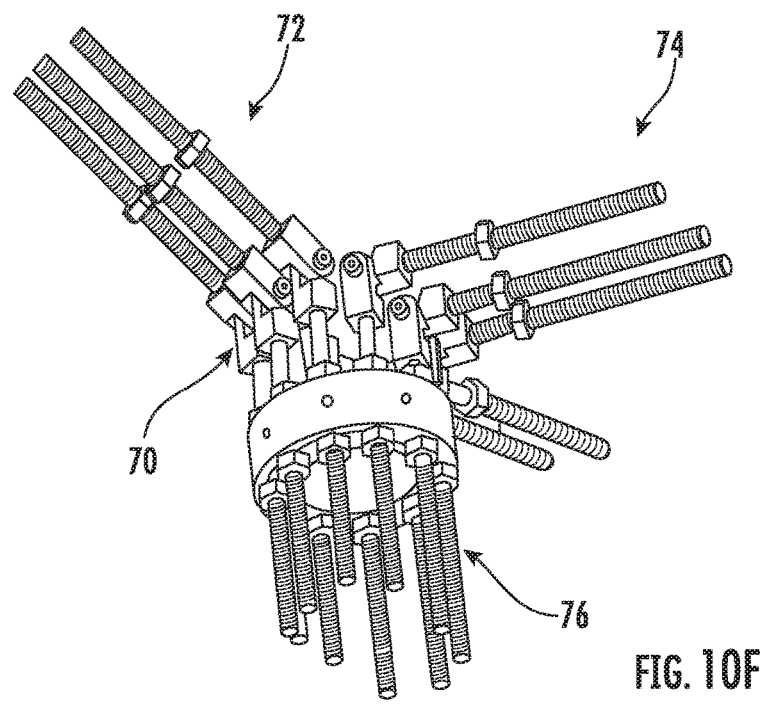
Figure 10G:
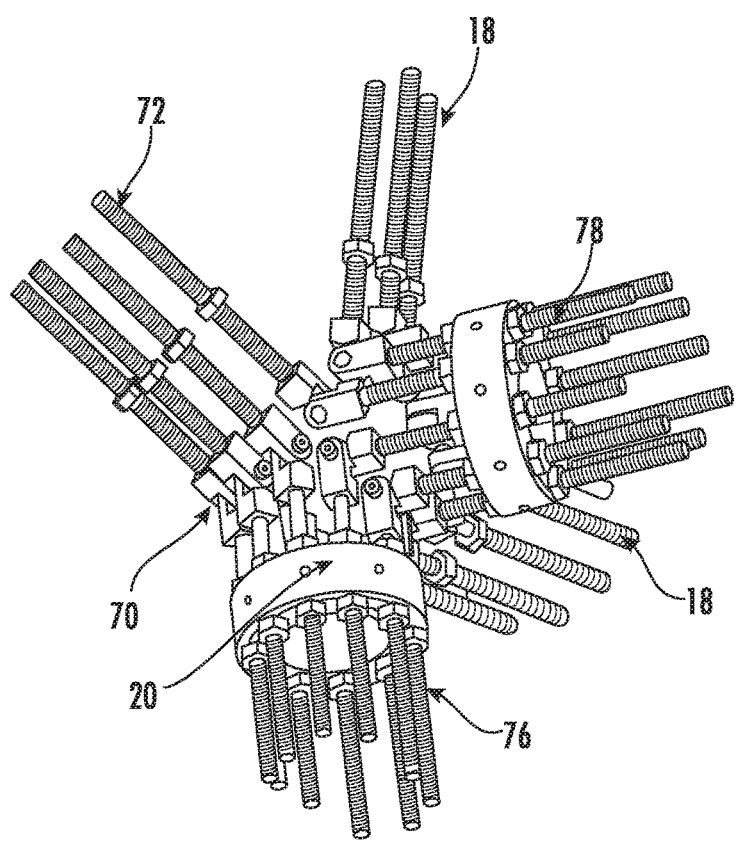
Figure 10H:
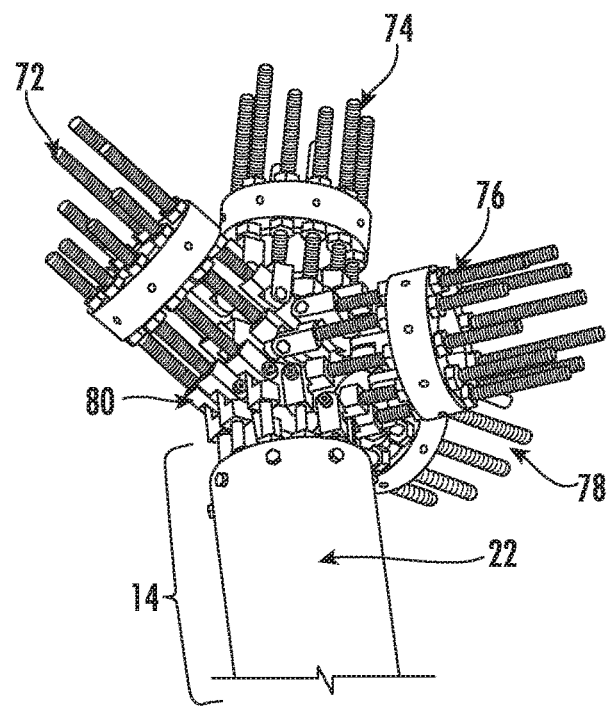

In a first example, as shown in FIGS. 10A-10H, the method includes determining the lattice model, assigning a plurality of modular units to the chords of the lattice model, assigning a set of connectors to each modular unit, identifying a first and second connector assigned to a first and second connected modular unit, joining a first connector with a second connector (as shown in FIG. 10A), orienting the first connector relative to the second connector based on the lattice model and securing the orientation with a fastener 64 (e.g., adjusting the angle between the first and second connectors, as shown in FIGS. 10B and 10C), repeating the identification and joining process for the remainder of a set of connectors 18 for a first modular unit (as shown in FIG. 10E), and coupling the connectors 18 of the first modular unit together with a bracket 20 (as shown in FIG. 10D). Each modular unit 14 can be formed after the constituent connectors 18 have been joined with one or more connectors 18 belonging to secondary modular units, as shown in FIGS. 10F, 10G, and 10H. A method can additionally include adjusting the working length of each connector 18 before or after the first and second connectors are joined, such as by adjusting the position of the joint end along the connector length.

Multiple modular units may be assembled with one another, with a varying number of modular units capable of being interconnected at a joint. For example, FIG. 10F shows a joint 70 formed of a first modular unit 72, a second modular unit 74, and a third modular unit 76. Connectors 18 of the third modular unit 76 engage connectors 18 of the first modular unit 72 and second modular unit 74 to secure the first modular unit 72, second modular unit 74, and third modular unit 76 together. FIG. 10G further shows incorporation of a fourth modular unit 78, and FIG. 10H shows incorporation of a fifth modular unit 80 into the joint 70.

Figure 11A:
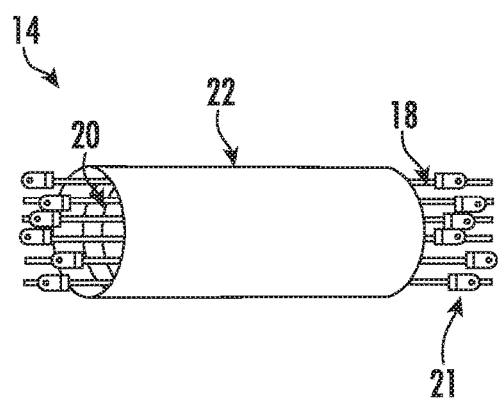
FIGS. 11A, 11B, 11C, and 11D are schematic representations of the sub-processes of a second example method of constructing a structure using the modular units according to one embodiment of the present disclosure.
Figure 11B:
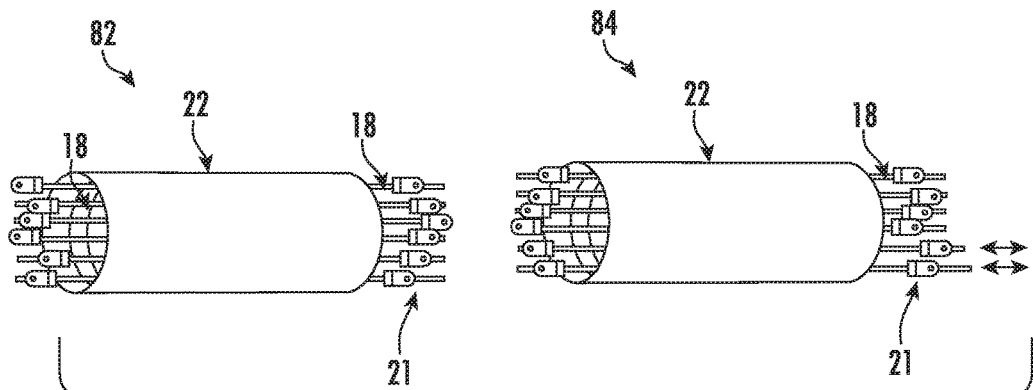
Figure 11C:
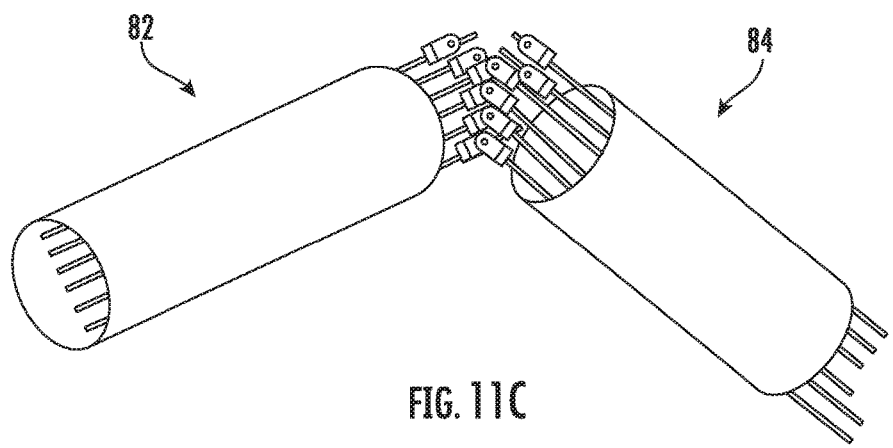
Figure 11D:
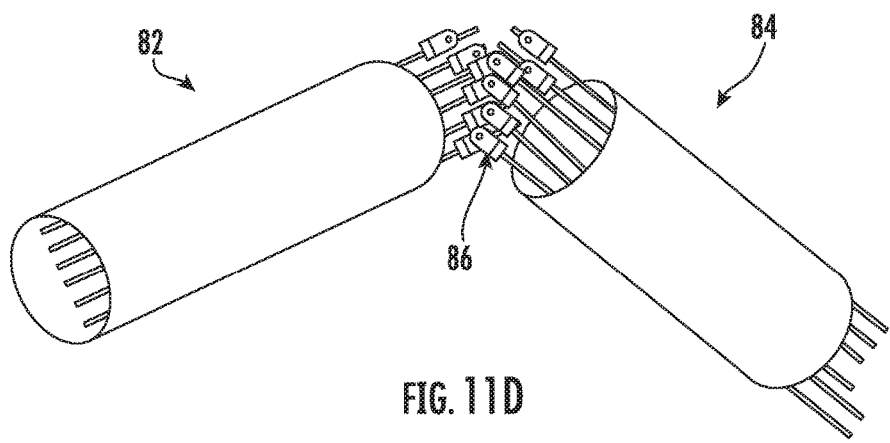

In one example, a method includes determining the lattice model, constructing a plurality of modular units 14 (as shown in FIG. 11A), assigning the plurality of modular units to chords of the lattice model, adjusting a working length of each of the plurality of modular units 14 to the respective chord length based on the lattice model by adjusting the working length of the connectors 18 of each modular unit 14 (as shown in FIG. 11B), orienting a first modular unit 82 relative to a second modular unit 84 assigned to an adjacent chord (as shown in FIG. 11C), and joining modular units 14 assigned to adjacent chords together using joint ends 86 (as shown in FIG. 11D).

Figure 13:
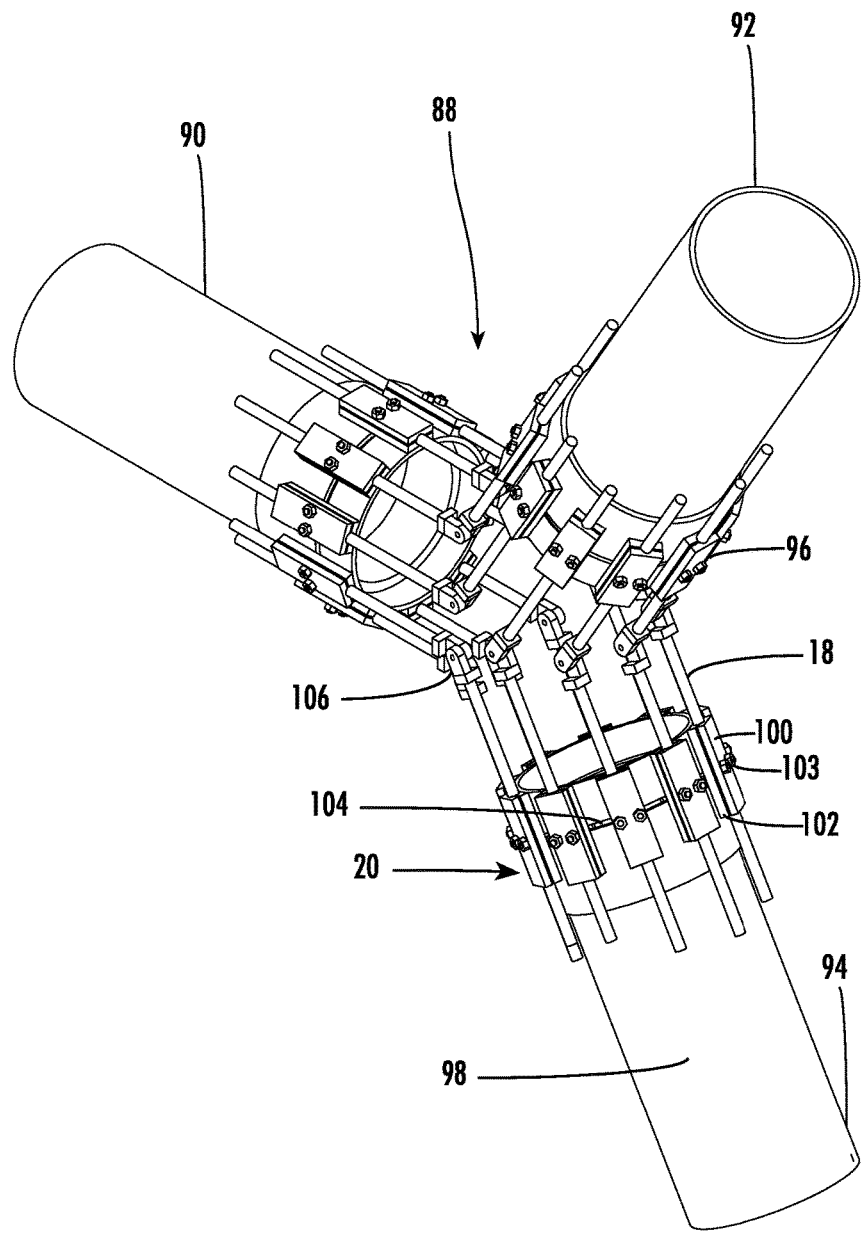
FIG. 13 is a schematic representation of a joint and position retention mechanism according to one embodiment of the present disclosure.
Figure 14:
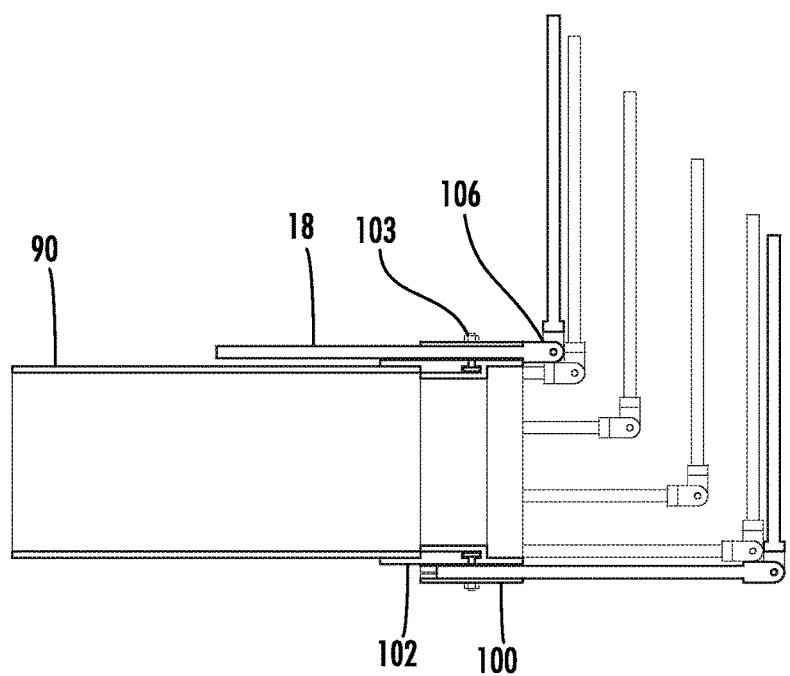
FIG. 14 is a cross-sectional side view of a joint and position retention mechanism according to one embodiment of the present disclosure.

Referring now to FIG. 13, embodiments of the present disclosure further include various other types of suitable brackets and position retention mechanisms for securing modular units to one another at a joint. A joint 88 is shown having joined members including a first modular unit 90, a second modular unit 92, and a third modular unit 94. Each of the modular units 90, 92, and 94 includes the plurality of connectors 18 radially arranged around a longitudinal axis of each of the modular units 90, 92, and 94. In the embodiment of FIG. 13, the bracket 20 of each of the modular units 90, 92, and 94 includes a plurality of clamps 96 attached to a body 98 of the modular units 90, 92, and 94, the plurality of clamps 96 acting as a position retention mechanism for the connectors 18. The clamps 96 capture the connectors 18 between opposing members 100 and 102 (FIG. 14), wherein the opposing members 100 and 102 are held together with one or more fasteners 103 extending through the opposing members 100 and 102 and through a slot 104 formed around each of the modular units 90, 92, and 94.

The joint 88 is assembled by attaching each of the modular units 90, 92, and 94 to one another with the plurality of connectors 18. The connectors 18 are attached to the bracket 20 with the plurality of clamps 96. Prior to tightening the clamps 96, the clamps 96 may be adjusted around the modular units 90, 92, and 94 by sliding the clamps 96 along the slot 104. Connectors 18 of each of the modular units may be joined with connectors 18 of other of the modular units 90, 92, and 94 at a plurality of connector joints 106. When more than two modular units are connected at the joint 88, connectors 18 of each of the modular units 90, 92, and 94 are preferably attached to brackets 20 of each of the other modular units 90, 92, and 94, such that the multiple modular units are all joined with one another.

Figure 15:
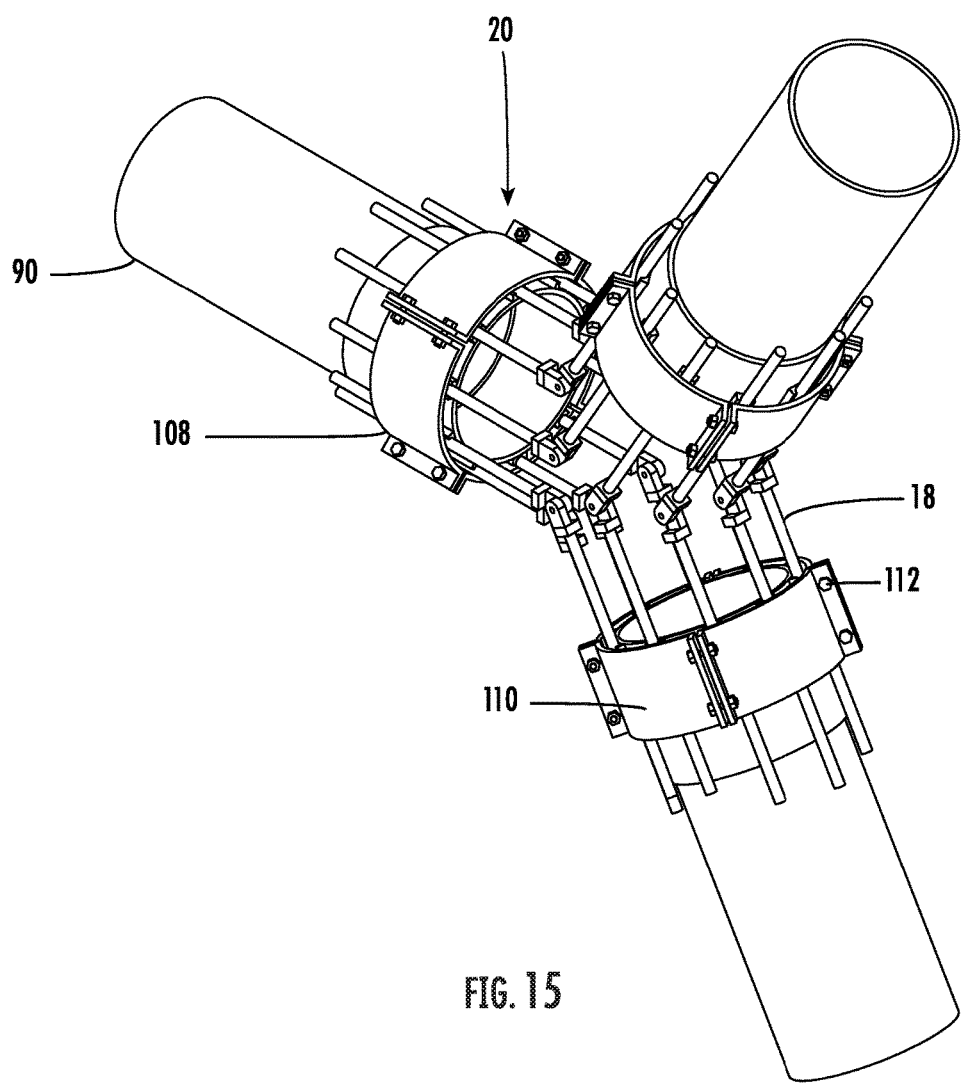
FIG. 15 is a schematic representation of a joint and position retention mechanism according to one embodiment of the present disclosure.
Figure 16:
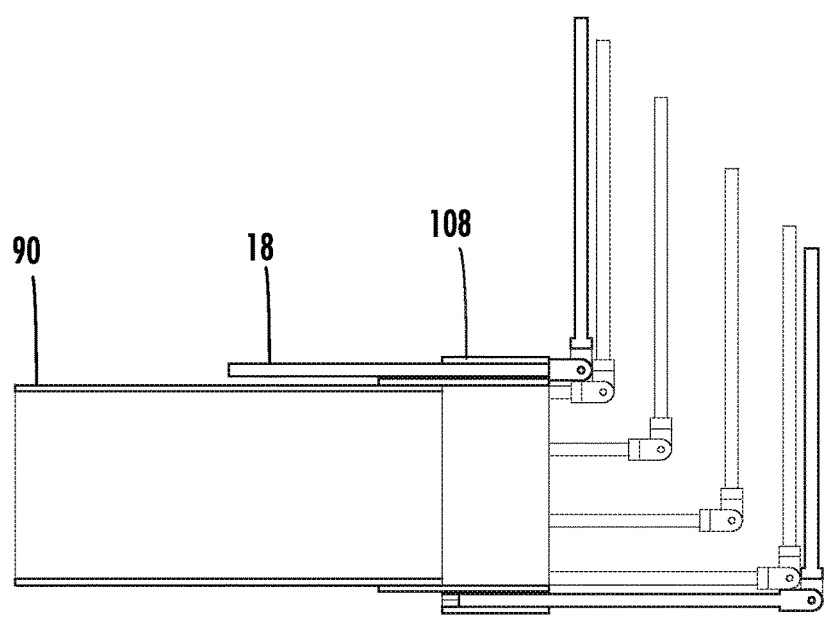
FIG. 16 is a cross-sectional side view of a joint and position retention mechanism according to one embodiment of the present disclosure.

In one embodiment, the bracket 20 may be formed of a clamp 108 positioned around the modular unit 90 as a position retention mechanism of the connectors 18 as shown in FIGS. 15 and 16. The clamp 108 may be formed of a plurality of clamp members 110 attached to one another around the modular unit 90 with one or more fasteners 112. A position of the connectors 18 is maintained by the clamp 108 by tightening the one or more fasteners 112, thereby reducing a diameter of the clamp 108 and trapping the connectors 18 between the clamp 108 and the modular unit 90.

The modular construction system and modular units of the present disclosure advantageously allow construction of a multi-member joint and lattice structure. The construction system and methods described herein permit various modular units to be constructed into joints having a varying number of members attached at the joint. Further, such joints may be readily formed using basic tools and without requiring welding or other more complicated methods for joining structural members.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A modular unit for forming a multiple member joint, the modular unit comprising:
    an elongate body comprising a shell;
    a bracket attached adjacent an end of the elongate body, the bracket located continuously around a longitudinal axis of the modular unit, and the shell is attached to the bracket around a diameter of the bracket;
    a plurality of connectors associated with the bracket and retained therein by a position retention mechanism, the plurality of connectors extending from the end of the elongate body parallel to the longitudinal axis of the modular unit; and
    one or more connector joints attached at a distal end of the plurality of connectors, wherein the one or more connector joints are configured to join with one or more connector joints of connectors extending from connectors of an adjoining modular unit.

2. The modular unit of claim 1, wherein the diameter of the bracket is an outer diameter, the shell is attached to the bracket around the outer diameter of the bracket.

3. The modular unit of claim 1, the bracket further comprising a clamp formed around the end of the modular unit, wherein positions of the connectors are retained between the clamp and the modular unit when the clamp is substantially tightened.

4. The modular unit of claim 1, the bracket further comprising a first coupling rail and a second coupling rail defining a coupling groove formed around the longitudinal axis of the modular unit, the coupling groove sized to receive a portion of each of the plurality of connectors therethrough.

5. The modular unit of claim 4, the plurality of connectors further comprising a threaded portion formed along a length of the plurality of connectors and at least one nut threadably engaged with the threaded portion of the connectors, wherein the position retention mechanism comprises the threaded portion of the connectors secured through the coupling groove of the bracket with the at least one nut.

6. The modular unit of claim 1, the bracket further comprising a plurality of clamps having opposing members and a fastener for securing the opposing members of the clamps to the modular unit, wherein each of the clamps secures an end of the connectors to the modular unit.

7. The modular unit of claim 6, further comprising at least one slot formed around a perimeter of the modular unit adjacent the end of the modular unit, wherein the fastener extends through the opposing members and the slot to adjustably secure the connectors to the modular unit.

8. The modular unit of claim 1, wherein the modular unit is a first modular unit, and further comprising a second modular unit identical to the first modular unit, the second modular unit joined with the first modular unit at the one or more connector joints attached at the distal ends of the plurality of connectors.

9. The modular unit of claim 8, wherein connectors of the modular unit are joined with connectors of the second modular unit such that the longitudinal axis of the modular unit is angled relative to a longitudinal axis of the second modular unit.

10. The modular unit of claim 1, wherein the bracket and plurality of connectors are attached at both a first end and a second end of the elongate body.

11. The modular unit of claim 10, wherein a working length of the plurality of connectors between joint ends of the connectors is adjustable.

12. A multiple member joint comprising:
    first and second modular units, each of the first and second modular units including:
        an elongate body comprising a shell,
        a bracket attached adjacent an end of the elongate body, the bracket located continuously around a longitudinal axis of a respective said modular unit, and the shell is attached to the bracket around a diameter of the bracket,
        a plurality of connectors associated with the bracket and retained therein by a position retention mechanism, the plurality of connectors extending from the end of the elongate body parallel to the longitudinal axis of the respective modular unit, and
        one or more connector joints attached at a distal end of the plurality of connectors, wherein the one or more connector joints are configured to join with one or more connector joints of connectors extending from connectors of an adjoining modular unit;
    wherein the connector joints of the first modular unit are joined with the connector joints of the second modular unit to join the first modular unit and the second modular unit at a joint.

13. The multiple member joint of claim 12, further comprising:
    a third modular unit having
        an elongate body,
        a bracket attached adjacent an end of the elongate body, the bracket located around a longitudinal axis of the third modular unit,
        a plurality of connectors associated with the bracket with a position retention mechanism, the plurality of connectors extending from the end of the elongate body parallel to the longitudinal axis of the third modular unit, and
        one or more connector joints attached at a distal end of the plurality of connectors, wherein the one or more connector joints are adapted to join with one or more connector joints of connectors extending from connectors of an adjoining modular unit;
    wherein connector joints of the first modular unit are joined with connector joints of both the second modular unit and the third modular unit to join the first modular unit with the second modular unit and the third modular unit.

14. The multiple member joint of claim 13, further comprising:
- a fourth modular unit having
  - an elongate body,
  - a bracket attached adjacent an end of the elongate body, the bracket located around a longitudinal axis of the fourth modular unit,
  - a plurality of connectors associated with the bracket with a position retention mechanism, the plurality of connectors extending from the end of the elongate body parallel to the longitudinal axis of the fourth modular unit, and
  - one or more connector joints attached at a distal end of the plurality of connectors, wherein the one or more connector joints are adapted to join with one or more connector joints of connectors extending from connectors of an adjoining modular unit;
- wherein connector joints of the first modular unit are joined with connector joints of each of the second modular unit, the third modular unit, and the fourth modular unit to join the first modular unit with the second modular unit, the third modular unit, and the fourth modular unit.

15. A lattice structure comprising:
- a plurality of interconnected chords, each of the interconnected chords including
  - an elongate body comprising a shell,
  - a bracket attached adjacent an end of the elongate body, the bracket located continuously around a longitudinal axis of a respective said chord, and the shell is attached to the bracket around a diameter of the bracket,
  - a plurality of connectors associated with the bracket and retained therein by a position retention mechanism, the plurality of connectors extending from the end of the elongate body parallel to the longitudinal axis of the respective chord, and
  - one or more connector joints attached at a distal end of the plurality of connectors, wherein the one or more connector joints are configured to join with one or more connector joints of connectors extending from connectors of an adjoining chord;
- wherein connector joints of the chords are joined with connector joints of adjacent chords to join the chords at a plurality of joints of the lattice structure.

16. The lattice structure of claim 15, further comprising a cover attached to the lattice structure over the plurality of chords.

* * * * *